(12) United States Patent
Ward

(10) Patent No.: US 9,191,652 B2
(45) Date of Patent: Nov. 17, 2015

(54) SYSTEMS AND METHODS FOR PRESENTING THREE-DIMENSIONAL CONTENT USING PHOTOSENSITIVE LENSES

(71) Applicant: Echostar UK Holdings Limited, Keighley (GB)

(72) Inventor: Martyn Ross Ward, West Yorkshire (GB)

(73) Assignee: Echostar UK Holdings Limited, Keighley (GB)

( * ) Notice: Subject to any disclaimer, the term of this patent is extended or adjusted under 35 U.S.C. 154(b) by 37 days.

(21) Appl. No.: 13/905,949

(22) Filed: May 30, 2013

(65) Prior Publication Data
US 2013/0258072 A1    Oct. 3, 2013

Related U.S. Application Data

(63) Continuation of application No. 12/699,266, filed on Feb. 3, 2010, now Pat. No. 8,477,400.

(51) Int. Cl.
| | |
|---|---|
| G02F 1/03 | (2006.01) |
| H04N 13/04 | (2006.01) |
| G03B 35/16 | (2006.01) |
| G02B 27/22 | (2006.01) |

(52) U.S. Cl.
CPC ........ *H04N 13/0402* (2013.01); *G02B 27/2228* (2013.01); *H04N 13/0438* (2013.01); *H04N 2213/008* (2013.01)

(58) Field of Classification Search
CPC ........... H04N 13/0402; H04N 13/0438; G02B 27/2228
USPC ......................... 359/240–242; 352/63; 348/53
See application file for complete search history.

(56) References Cited

U.S. PATENT DOCUMENTS

| | | | |
|---|---|---|---|
| 5,181,133 A | 1/1993 | Lipton | |
| 2003/0214630 A1* | 11/2003 | Winterbotham | 351/203 |
| 2009/0073558 A1 | 3/2009 | Jacobs et al. | |
| 2009/0316058 A1 | 12/2009 | Huizinga et al. | |
| 2011/0188107 A1 | 8/2011 | Ward | |
| 2011/0228215 A1 | 9/2011 | Jacobs et al. | |
| 2012/0038982 A1 | 2/2012 | Huizinga et al. | |

OTHER PUBLICATIONS

Yoshizawa, Megumi, Nikkei Microdevices, "Japanese University Develops Fast-Reacting Organic Photochromic Compound," Tech & Industry Analysis from Asia, Apr. 3, 2009; retrieved from the Internet on Feb. 3, 2010 at http://techon.nikkeibp.co.jp/english/NEWS_EN/20090402/168223/.

(Continued)

*Primary Examiner* — William Choi
(74) *Attorney, Agent, or Firm* — Ingrassia Fisher & Lorenz, P.C.

(57) ABSTRACT

Systems and methods are provided for presenting three-dimensional content on a display. An exemplary system for presenting a plurality of frames on a display comprises a first lens, a second lens, and an activation system. The activation system utilizes electromagnetic radiation to activate the first lens when a respective frame being presented on the display corresponds to the first lens, resulting in the first lens being substantially transparent and the second lens being substantially opaque, and to activate the second lens when a respective frame being presented on the display corresponds to the second lens, resulting in the second lens being substantially transparent and the first lens being substantially opaque.

19 Claims, 5 Drawing Sheets

(56) References Cited

OTHER PUBLICATIONS

European Patent Office, International Searching Authority, "International Search Report" mailed Mar. 25, 2011; International Appln. No. PCT/EP2011/051603, filed Feb. 3, 2011.

USPTO "Non-Final Office Action" dated Oct. 19, 2012 for U.S. Appl. No. 12/699,266.
USPTO "Notice of Allowance" dated Mar. 12, 2013 for U.S. Appl. No. 12/699,266.
Canadian Intellectual Property Office, Office Action, dated Apr. 2, 2014 for Canadian Application No. 2,788,996.

* cited by examiner

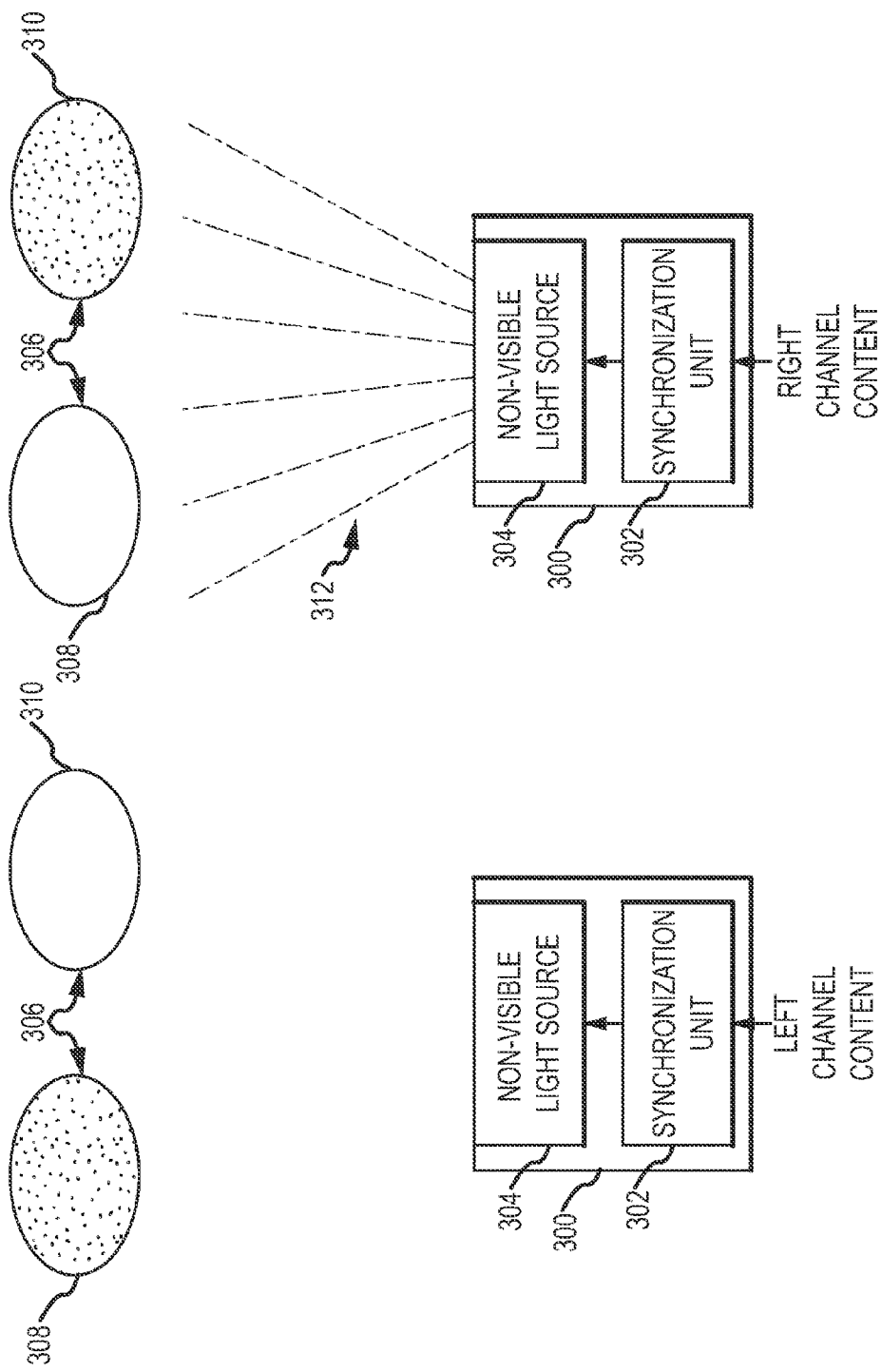

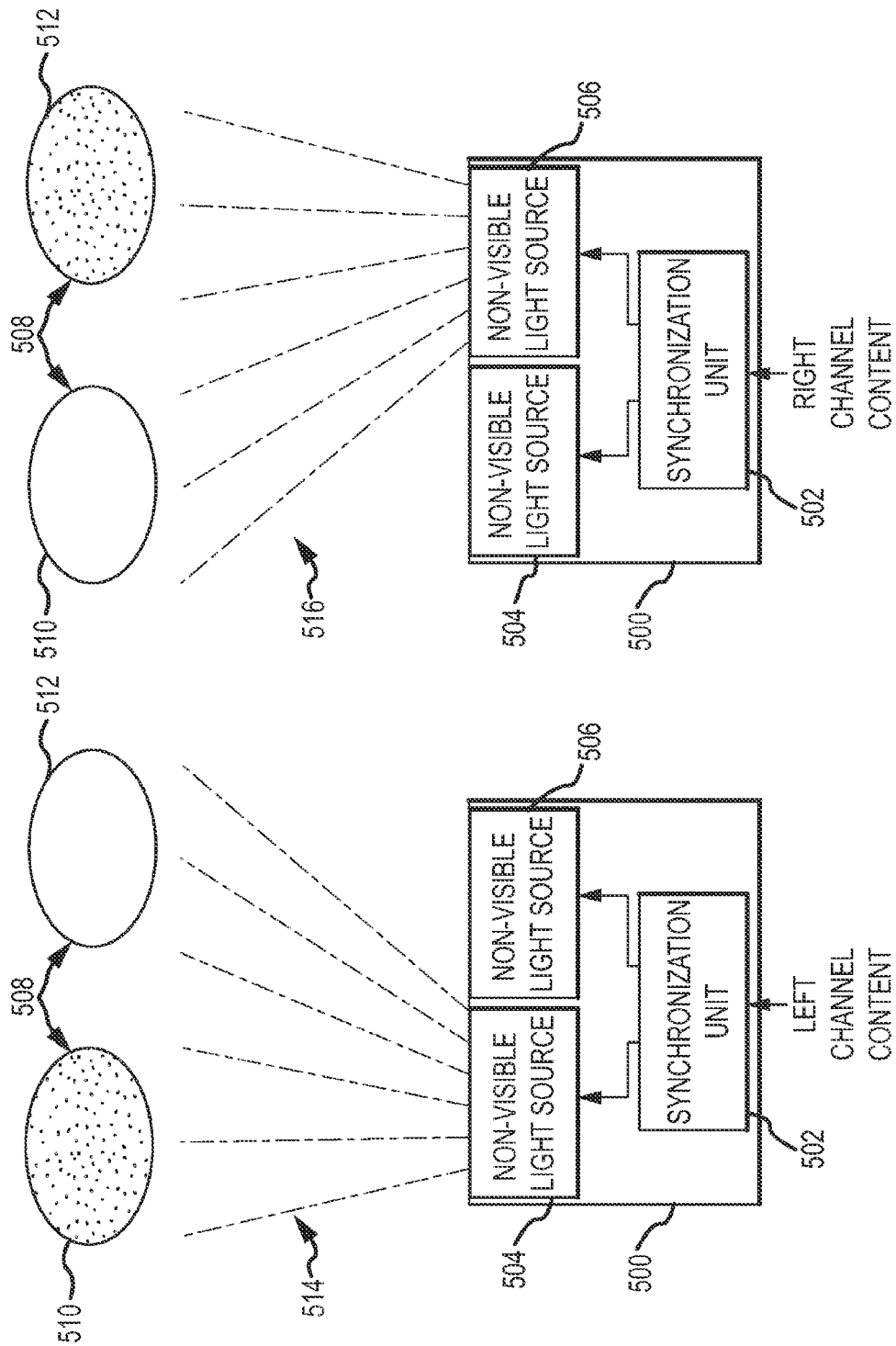

US 9,191,652 B2

SYSTEMS AND METHODS FOR PRESENTING THREE-DIMENSIONAL CONTENT USING PHOTOSENSITIVE LENSES

CROSS-REFERENCE TO RELATED APPLICATIONS

This application is a continuation of U.S. patent application Ser. No. 12/699,266, filed Feb. 3, 2010.

TECHNICAL FIELD

The following discussion generally relates to the presentation of three-dimensional (3D) imagery, and more particularly, three-dimensional video.

BACKGROUND

Three-dimensional imagery may be achieved by presenting content that is resolved into separate images by a viewer's left and right eyes. When the two separate images are received simultaneously, the viewer perceives a three-dimensional image by fusing the images received by the left and right eyes and using parallax to achieve depth perception.

It is desirable to provide three-dimensional video using televisions and other display technologies conventionally used to present two-dimensional images and/or video due to the ubiquity of such displays. One technique used to present 3-D imagery on a 2-D display involves the use of tinted glasses configured such that each of the viewer's eyes sees a differently tinted (or filtered) image. Another technique involves the use of glasses with differently polarized lenses. Each of these techniques, however, requires the use of specialized glasses or other filters to capture the content being displayed. If the appropriate eyeglass or other filters are not readily available, then each of these techniques is of limited usefulness. Yet another technique involves the use of glasses including liquid crystal displays (LCDs) that function like shutters to alternate which eye receives an image being presented on the display. The LCDs require electronics and power to operate which increases the size and cost of these headsets.

BRIEF SUMMARY

According to various exemplary embodiments, systems and methods are presented for presenting three-dimensional content on a display. An exemplary system for presenting a plurality of frames on a display comprises a first lens, a second lens, and an activation system. The activation system utilizes electromagnetic radiation to activate the first lens when a respective frame being presented on the display corresponds to the first lens, resulting in the first lens being substantially transparent and the second lens being substantially opaque, and to activate the second lens when a respective frame being presented on the display corresponds to the second lens, resulting in the second lens being substantially transparent and the first lens being substantially opaque.

In other embodiments, a system comprises a processor, a source configured to emit electromagnetic radiation, and a synchronization unit. The processor is configured to present a frame for viewing, wherein the synchronization unit is coupled to the source, wherein the synchronization unit is configured to signal the source to emit electromagnetic radiation such that the electromagnetic radiation is emitted in sync with the frame being presented for viewing.

Still other embodiments relate to a method of presenting three-dimensional content comprising a plurality of frames. In an exemplary embodiment, each frame corresponds to either a first eye of a prospective viewer or a second eye of the prospective viewer. The method suitably comprises displaying the plurality of frames on a display, activating a first lens configured to be aligned with the first eye of the prospective viewer when a respective frame on the display corresponds to the first eye, and activating a second lens configured to be aligned with the second eye of the prospective viewer when a respective frame on the display corresponds to the second eye.

Various embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary system for presenting three-dimensional content;

FIG. 3 and FIG. 4 are diagrams of an exemplary activation system and a pair of lenses suitable for use in the system of FIG. 1 or FIG. 2;

FIG. 5 and FIG. 6 are diagrams of an exemplary activation system and a pair of lenses suitable for use in the system of FIG. 1 or FIG. 2.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Technologies and concepts discussed herein relate to systems and methods for presenting three-dimensional ("3D" or "3-D") imagery to a viewer. As described in greater detail below, photosensitive (or reactive) lenses are used to allow a viewer to perceive different sets of imagery through the left and right eyes respectively, thereby creating a stereoscopic effect. The lenses have different photosensitivity, such that in response to a particular spectrum of electromagnetic radiation, one lens is substantially transparent while the other is substantially opaque. As described in greater detail below, a lens is substantially transparent when the opacity of the lens has a negligible impact on a viewer's perception through the lens, and a lens is substantially opaque when the opacity of the lens results in negligible perception through the lens. In an exemplary embodiment, the transparency/opacity of the lenses are alternated in sync with the content being displayed, such that content designated for the left eye of the viewer is perceived through the lens aligned with the viewer's left eye and content designated for the right eye of the viewer is perceived through the lens aligned with the viewer's right eye.

Figure 1:
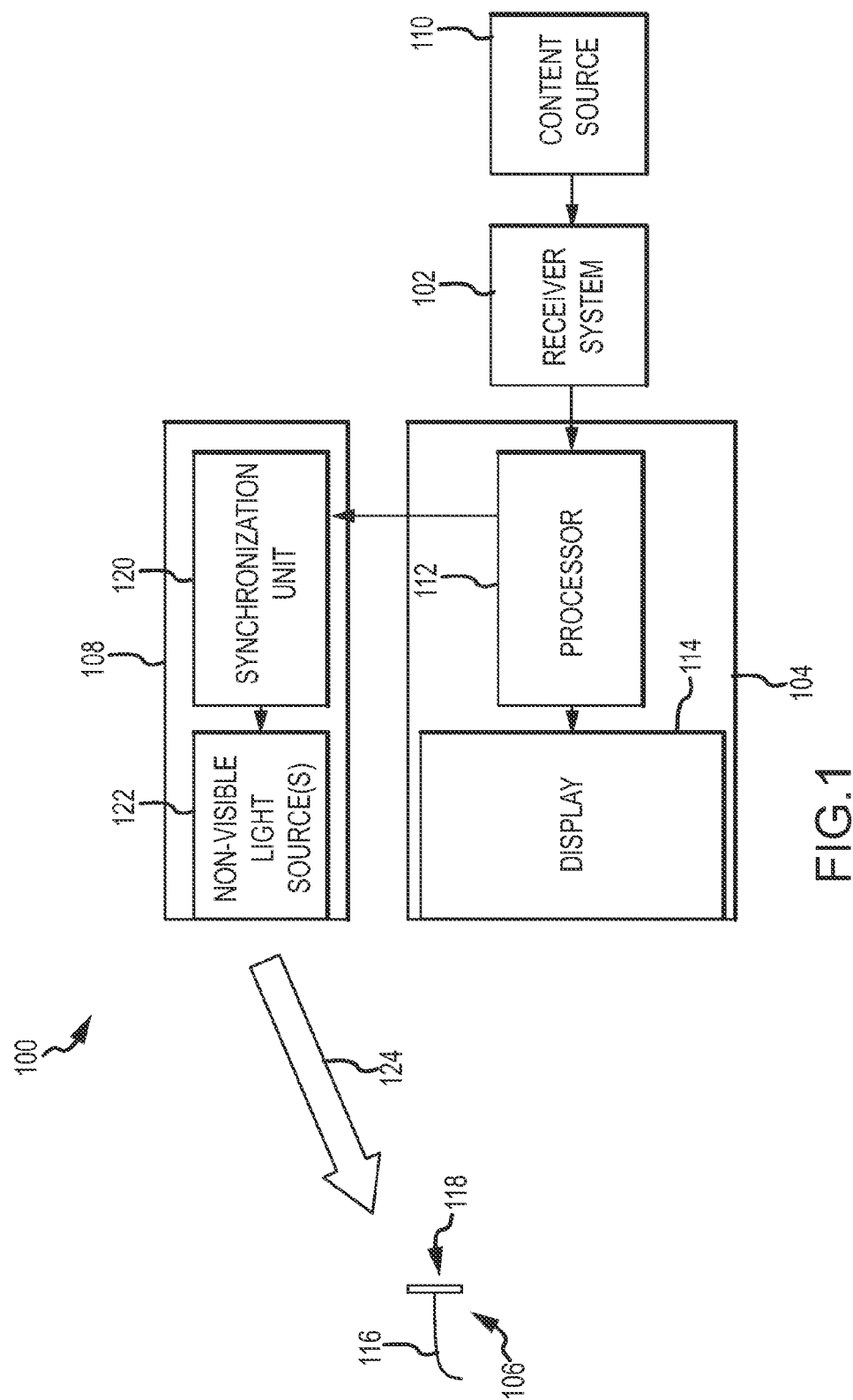

Referring now to FIG. 1, in an exemplary embodiment, a system 100 for presenting three-dimensional content suitably includes a receiver system 102, a display system 104, a head-mountable device 106 including a pair of lenses 118, and an activation system 108. The display system 104 includes a processor 112 coupled to the receiver system 102 and configured to present images and/or video corresponding to the content received by the receiver system 102 from the content source 110 on a display 114. As described in greater detail below, in an exemplary embodiment, the lenses 118 comprise reactive lenses (or alternatively, photosensitive lenses or light-sensitive lenses) that are aligned with the eyes of a viewer and interposed in the viewer's line of sight between the viewer and the display 114, wherein the activation system 108 emits electromagnetic radiation 124 in sync with frames being presented on the display 114 to vary the transparency and/or opacity of the lenses 118 and achieve stereoscopic imaging.

The receiver system 102 generally represents the devices, components, circuitry and/or logic capable of receiving and processing video content from a content source 110. The content source 110 may provide video content to the receiver system 102 over any sort of broadcast or other distribution channel, such as, for example, broadcast television, very small aperture terminal (VSAT) satellite (e.g., for movie distribution), direct broadcast satellite (DBS), cable television, cellular or other wireless telephone networks, Internet or other data communications networks, physical media, and/or another suitable avenue for delivering content.

In an exemplary embodiment, the video content provided by the content source 110 comprises a plurality of video frames that are encoded or otherwise configured for stereoscopic imaging. In this regard, each video frame comprises a still image that is designated for or otherwise intended to be perceived by either a left eye or a right eye of a viewer. As used herein, the content designated for and/or intended to be perceived by the left eye of a prospective viewer may be referred to herein as the left channel content (or left channel frame) and the content designated for and/or intended to be perceived by the right eye of a prospective viewer may be referred to herein as the right channel content (or right channel frame). In an exemplary embodiment, the right channel video frames comprise images captured by a first camera and the left channel video frames comprise images captured by a second camera positioned to the left of the first camera, resulting in parallax between the right channel content and the left channel content. Thus, when a viewer perceives the right channel content with his or her right eye and the left channel content with his or her left eye at the same time, the parallax results in the viewer perceiving depth, thereby producing a three-dimensional image.

In an exemplary embodiment, the right channel frames and the left channel frames are spliced such that the content provided by the content source 110 comprises frames that alternate between the right channel and the left channel, also known as alternate-frame sequencing. For example, a first (or initial) frame of the content from the content source 110 may be encoded or otherwise designated for the right eye, a second frame subsequent the first frame may be encoded or otherwise designated for the left eye, a third frame subsequent the second frame may be encoded or otherwise designated for the right eye, and so on. In an exemplary embodiment, the frame rate of the video content provided by the content source 110 is greater than 30 Hz (or 30 frames per second), such that each eye perceives its corresponding frames at a rate of at least 15 frames per second to create the illusion of a moving picture with limited flickering or other visual artifacts that may otherwise be perceptible at lower frame rates. The synchronized sequential presentation of a right channel frame to the right eye and a left channel frame to the left eye provides the viewer the impression that the sequential right channel and left channel frames are being presented on the display 114 simultaneously, resulting in a three-dimensional image.

In an exemplary embodiment, each lens 118 is photosensitive and has variable transparency and/or opacity, wherein the transparency and/or opacity of a respective lens 118 is influenced by the presence and/or absence of a particular spectrum of electromagnetic radiation. The transparency and opacity of the lenses 118 are controlled by electromagnetic radiation 124 emitted by the activation system 108, as described in greater detail below. In an exemplary embodiment, the lenses 118 are configured such that the lens aligned with the right eye of the viewer (e.g., the right lens) is substantially transparent while the lens aligned with the left eye of the viewer (e.g., the left lens) is substantially opaque, and the right lens is substantially opaque while the left lens is substantially transparent. For example, one lens (e.g., the left lens) may comprise a photochromatic material that is transparent in the absence of ultraviolet radiation and opaque in the presence of ultraviolet radiation, and the other lens (e.g., the right lens) may comprise an inverse photochromatic material that is opaque in the absence of ultraviolet radiation and transparent in the presence of ultraviolet radiation. In this embodiment, as described in greater detail below, the activation system 108 may emit ultraviolet radiation in sync with a right channel frame being presented on the display 114 to cause the left lens to be opaque and the right lens to be transparent when the right channel frame is presented on the display 114, and the activation system 108 may cease emitting ultraviolet radiation in sync with a left channel frame being presented on the display 114 to cause the right lens to be opaque and the left lens to be transparent when the left channel frame is presented on the display 114.

As shown in FIG. 1, in accordance with one or more embodiments, the head-mountable device 106 includes a support structure 116 adapted to be worn on the head of a viewer of display 114 and configured to support and/or house the pair of lenses 118 such that the lenses 118 are aligned with the eyes of the viewer. In other words, the lenses 118 are interposed in the viewer's line of sight between the viewer and the display 114 when the support structure 116 is worn on the user's head. In accordance with one embodiment, the support structure 116 is realized as an eyeglass frame, however, in alternative embodiments, the support structure 116 may be realized as a helmet, goggles, mask, visor, or the like, and may include straps or other elements to provide support and/or comfort to a user. Furthermore, it should be appreciated that in some embodiments, the lenses 118 may be realized as contact lenses (e.g., lenses placed on the cornea of the eye), and in such embodiments, the system 100 need not include a head-mountable device 106 and/or support structure 116.

As described in greater detail below in conjunction with FIGS. 3-6, in an exemplary embodiment, the activation system 108 is configured to provide electromagnetic radiation 124 that causes one lens of the pair of lenses 118 to be substantially opaque while the other lens of the pair of lenses 118 is substantially transparent. In an exemplary embodiment, the activation system 108 includes a synchronization unit 120 and one or more source(s) 122 configured to emit electromagnetic radiation 124. In an exemplary embodiment, the source(s) 122 are positioned proximate to and/or adjacent to the display 114 such that the source(s) 122 are within a field of a view of a viewer when viewing the display 114. The source(s) 122 are realized as one or more non-visible light source(s) that emit electromagnetic radiation 124 in the non-visible portion of the electromagnetic spectrum under control of the synchronization unit 120, as described in greater detail below. In accordance with one or more embodiments, the non-visible light source(s) 122 emit electromagnetic radiation 124 diffusely to accommodate movement by a viewer wearing the head-mountable device 106 when viewing the display 114. The power level of the electromagnetic radiation 124 is chosen to satisfy a desired distance between the source(s) 122 and a prospective viewer, and in practice, the power level of the electromagnetic radiation 124 may vary depending on the needs of a particular embodiment.

The synchronization unit 120 generally represents the hardware, firmware and/or software (or combinations thereof) suitably configured to control the timing of the electromagnetic radiation 124 provided by the activation system 108 and/or non-visible light source(s) 122 such that the transparency and opacity of the lenses 118 are synchronized with the content being presented on the display 114. In this regard, the synchronization unit 120 controls the non-visible light source(s) 122 such that the right lens of the pair of lenses 118 is substantially transparent and the left lens of the pair of lenses 118 is substantially opaque when content corresponding to the right eye (or right channel) is presented for viewing on the display 114. Conversely, the synchronization unit 120 controls the non-visible light source(s) 122 such that the left lens of the pair of lenses 118 is substantially transparent and the right lens of the pair of lenses 118 is substantially opaque when content corresponding to the left eye (or left channel) is presented for viewing on the display 114.

The processor 112 generally represents the hardware, firmware and/or software (or combinations thereof) suitably configured to present images on the display 114 that correspond to the frames of the content received by the receiver system 102. The processor 112 may be implemented using any sort of microprocessor, microcontroller, digital signal processor or other logic capable of controlling the functionality and/or otherwise interacting with the display 114. The processor 112 may also be associated with a suitably configured memory, such as any sort of static, dynamic, flash or other memory capable of storing programming instructions and/or data for processing by processor 112. In various embodiments, processor 112 may be realized using a "system on chip" (SoC) implementation that incorporates a hybrid microcontroller with memory, an application specific integrated circuit (ASIC), or another suitable integrated hardware implementations. Depending on the embodiment, the display 114 may be realized as any sort of television, monitor and/or other display capable of presenting images to a viewer. In an exemplary embodiment, display 114 operates in conjunction with the processor 112 to generate images corresponding to the frames of the content received by the receiver system 102, as described in greater detail below. In the illustrated embodiment of FIG. 1, the synchronization unit 120 is coupled to the processor 112, and the synchronization unit 120 is configured to control the timing of the non-visible light source(s) 122 such that the appropriate electromagnetic radiation 124 is emitted (or ceases being emitted) in sync with the content being presented on the display 114.

It should be understood that FIG. 1 is a simplified representation of the system 100 for purposes of explanation and ease of description, and FIG. 1 is not intended to limit the application or scope of the subject matter in any way. Thus, although FIG. 1 depicts the receiver system 102, the display system 104, and the activation system 108 as discrete components, in some embodiments, the receiver system 102, the activation system 108 and/or processor 112 may be realized as an integrated product (e.g., a set-top box) or the activation system 108 and the display 114 and/or display system 104 may be realized as an integrated product (e.g., a television). In practice, the system 100 may include numerous other devices and components for providing additional functions and features, as will be appreciated in the art. For the sake of brevity, conventional techniques related to image processing, video processing, video encoding and/or decoding, stereoscopic imaging, and other functional aspects of the systems (and the individual operating components of the systems) may not be described in detail herein.

Figure 2:
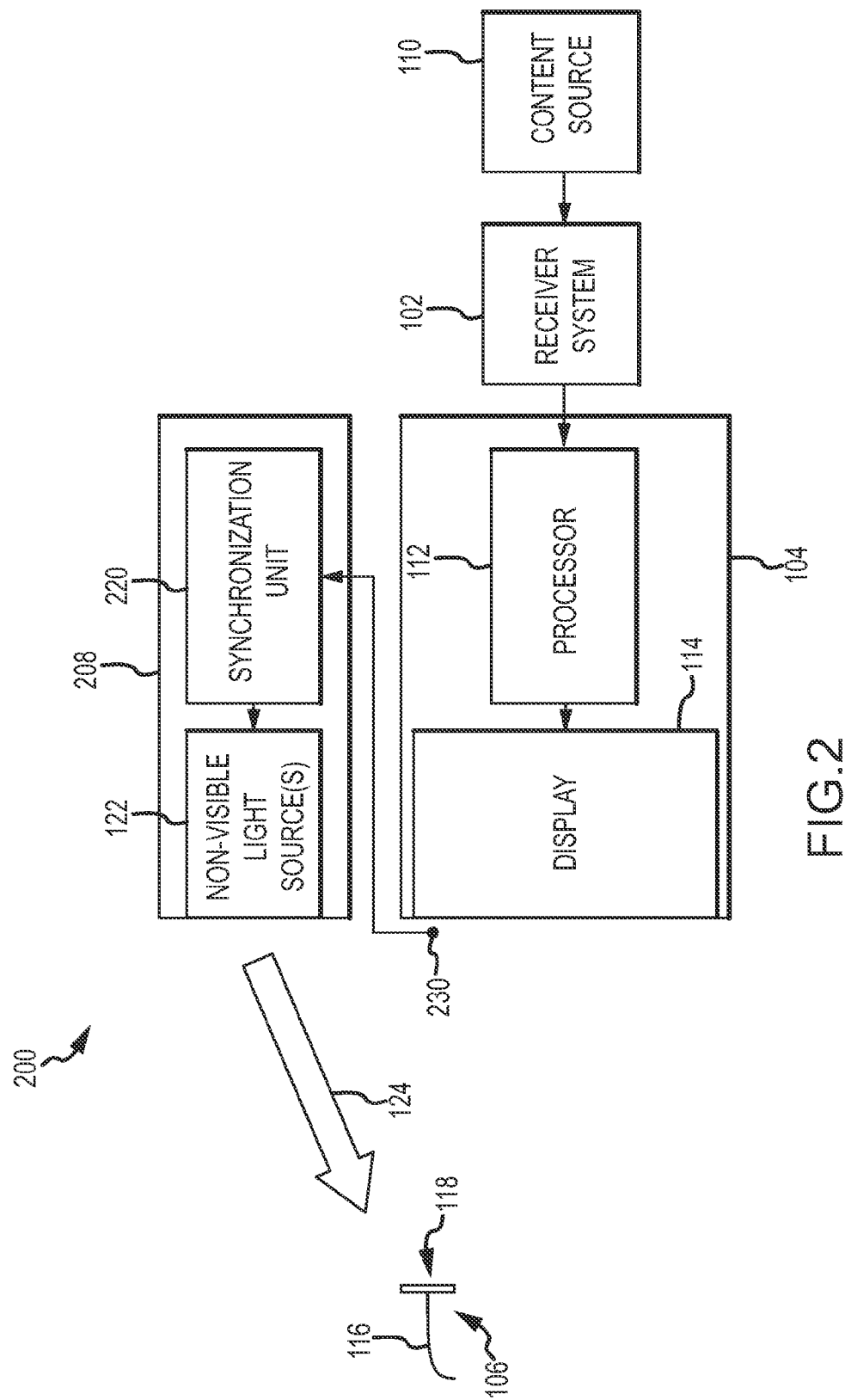
FIG. 2 is a block diagram of an exemplary system for presenting three-dimensional content.

FIG. 2 depicts another exemplary embodiment of a system 200 for presenting three-dimensional content. Various elements of the system 200 of FIG. 2 are similar to counterpart elements described above in the context of the system 100 of FIG. 1, and these similar elements will not be redundantly described in detail in the context of FIG. 2.

In the illustrated embodiment of FIG. 2, the system 200 includes an activation system 208 with a synchronization unit 220 that is configured to synchronize the electromagnetic radiation 124 emitted by the non-visible light source(s) 122 with the image presented by the display 114 by sensing or otherwise detecting the frame being presented by the display 114. In this embodiment, the synchronization unit 220 is coupled to one or more opto sensors 230 configured to sense or otherwise detect whether the display 114 is currently presenting a frame designated and/or encoded for the right eye (or right channel) or a frame designated and/or encoded for the left eye (or left channel). For example, in accordance with one or more embodiments, each frame may include a sync graphic in the upper corner of the frame that oscillates between a first state for frames corresponding to a first channel and a second state for frames corresponding to a second channel. The left channel frames may include a white sync graphic and the right channel frames may include a black sync graphic. In response to sensing or detecting a frame presented by the display 114 that corresponds to the right eye (or right channel), for example, by the opto sensor 230 detecting a black sync graphic, the synchronization unit 220 controls the non-visible light source(s) 122 such that the right lens of the pair of lenses 118 is substantially transparent and the left lens of the pair of lenses 118 is substantially opaque. Conversely, in response to sensing or detecting a frame presented by the display 114 that corresponds to the left eye (or left channel), for example, by the opto sensor 230 detecting a white sync graphic, the synchronization unit 120 controls the non-visible light source(s) 122 such that the left lens of the pair of lenses 118 is substantially transparent and the right lens of the pair of lenses 118 is substantially opaque.

FIG. 3 and FIG. 4 depict an exemplary embodiment of an activation system 300 and a pair of lenses 306 suitable for use as the activation system 108, 208 and pair of lenses 118 in the system 100 of FIG. 1 or the system 200 of FIG. 2. In the illustrated embodiment of FIG. 3 and FIG. 4, the activation system 300 and pair of lenses 306 are configured for operation with a single non-visible light source 304. In this regard, the lenses 306 are inversely reactive, such that in response to a spectrum of electromagnetic radiation 312, a first lens 308 is substantially transparent while the second lens 310 is substantially opaque, while in response to the absence of the spectrum of electromagnetic radiation 312, the first lens 308 is substantially opaque while the second lens 310 is substantially transparent. For example, one lens 310 (e.g., the lens aligned with the left eye of the viewer) may comprise a photochromatic material that is configured to be substantially transparent under ambient lighting conditions in the absence of electromagnetic radiation 312 from the non-visible light source 304 and the other lens 308 (e.g., the lens aligned with the right eye of the viewer) may comprise an inverse photochromatic material that is opaque under ambient lighting conditions in the absence of electromagnetic radiation 312 from the non-visible light source 304.

As shown in FIG. 3, the lenses 308, 310 are sensitive to the spectrum of electromagnetic radiation 312 emitted by the non-visible light source 304, such that in response to the spectrum of electromagnetic radiation 312 being emitted by the non-visible light source 304, the transparency of the first lens 308 increases to the point where the first lens 308 is substantially transparent while the opacity of the second lens 310 increases until the second lens 310 is substantially opaque. In other words, the electromagnetic radiation 312 emitted by the non-visible light source 304 increases the transparency of the first lens 308 and increases the opacity of the second lens 310. In the illustrated embodiment, the non-visible light source 304 may be realized as an ultraviolet light-emitting diode (LED) that provides electromagnetic radiation 312 comprising a portion of the ultraviolet spectrum, such as, for example, ultraviolet radiation having wavelengths of about 315 nanometers to about 400 nanometers. As shown in FIG. 4, in accordance with one or more embodiments, the non-visible light source 304 emits electromagnetic radiation 312 diffusely.

In an exemplary embodiment, the activation system 300 includes a synchronization unit 302 that synchronizes the emission of electromagnetic radiation 312 from the non-visible light source 304 with the content presented on the display 114. In this regard, when a frame of the received content that is designated for the right channel (or right eye) is presented on display 114, the synchronization unit 302 activates the lens aligned with the viewer's right eye (e.g., lens 308) and deactivates the lens aligned with the viewer's left eye (e.g., lens 310) by signaling the non-visible light source 304 to emit electromagnetic radiation 312, causing the viewer's right lens 308 to become substantially transparent and the viewer's left lens 310 to become substantially opaque as shown in FIG. 4. Conversely, when a frame of the received content that is designated for the left channel (or left eye) is presented on display 114, the synchronization unit 302 activates the lens aligned with the viewer's left eye (e.g., lens 310) and deactivates the lens aligned with the viewer's right eye (e.g., lens 308) by signaling the non-visible light source 304 to cease emitting electromagnetic radiation 312, thereby causing the viewer's right lens 308 to become substantially opaque and the viewer's left lens 310 to become substantially transparent as shown in FIG. 3. In this manner, the activation system 300 alternately activates and/or deactivates the pair of lenses 306 by emitting and/or ceasing emitting electromagnetic radiation 312 in sync with the displayed content to provide three-dimensional imagery to the viewer stereoscopically. Thus, the activation system 300 controls the pair of lenses 306 such that the right eye of the viewer perceives frames encoded or otherwise designated for the right eye (or right channel) and negligibly perceives (e.g., little or no perception of) frames encoded or otherwise designated for the left eye (or left channel) and the left eye of the viewer perceives frames encoded or otherwise designated for the left eye and negligibly perceives frames encoded or otherwise designated for the right eye. As described above, when the frame rate is great enough such that the viewer perceives the right channel and left channel as being displayed simultaneously, the synchronization of the frames and lenses produces a stereoscopic effect.

FIG. 5 and FIG. 6 depict another exemplary embodiment of an activation system 500 and a pair of lenses 508 suitable for use as the activation system 108, 208 and pair of lenses 118 in the system 100 of FIG. 1 or the system 200 of FIG. 2. In the illustrated embodiment of FIGS. 5 and 6, the activation system 500 and pair of lenses 508 are configured for operation with two non-visible light sources 504, 506. In this regard, each non-visible light source 504, 506 is configured to emit electromagnetic radiation over a different portion of the electromagnetic spectrum. For example, the first non-visible light source 504 may emit electromagnetic radiation 514 over a first portion of the electromagnetic spectrum and the second non-visible light source 506 may emit electromagnetic radiation 516 over a different portion of the electromagnetic spectrum. In this regard, in an exemplary embodiment, the portion of the electromagnetic spectrum emitted by the first non-visible light source 504 and the portion of the electromagnetic spectrum emitted by the second non-visible light source 506 are mutually exclusive, that is, the non-visible light sources 504, 506 do not emit electromagnetic radiation having the same wavelength and/or frequency as electromagnetic radiation emitted by the other light source 504, 506.

As shown in FIG. 5, in an exemplary embodiment, a first lens 510 (e.g., the lens aligned with the right eye of the viewer) of the pair of lenses 508 is configured to be substantially opaque while the second lens 512 (e.g., the lens aligned with the left eye of the viewer) is configured to be substantially transparent when electromagnetic radiation 514 over a first portion of the electromagnetic spectrum that is emitted from the first non-visible light source 504 and electromagnetic radiation 516 over a second portion of the electromagnetic spectrum is not emitted by the second non-visible light source 506. As shown in FIG. 6, when electromagnetic radiation 516 over a second portion of the electromagnetic spectrum is emitted by the second non-visible light source 506 and electromagnetic radiation 514 over the first portion of the electromagnetic spectrum is not emitted from the first non-visible light source 504, the first lens 510 (e.g., the lens aligned with the right eye of the viewer) becomes substantially transparent while the second lens 512 (e.g., the lens aligned with the left eye of the viewer) becomes substantially opaque.

As described above, the activation system 500 includes a synchronization unit 502 that synchronizes the emission of electromagnetic radiation 514, 516 from the non-visible light sources 504, 506 with the content presented on the display 114. In this regard, when a frame of the received content that is designated for the right channel (or right eye) is presented on the display 114, the synchronization unit 502 activates the lens aligned with the viewer's right eye (e.g., lens 510) and deactivates the lens aligned with the viewer's left eye (e.g., lens 512) by signaling the first non-visible light source 504 to cease emitting electromagnetic radiation 514 and signaling second non-visible light source 506 to emit electromagnetic radiation 516, causing the viewer's right lens 510 to become substantially transparent and the viewer's left lens 512 to become substantially opaque as shown in FIG. 6. Conversely, when a frame of the received content that is designated for the left channel (or left eye) is presented on the display 114, the synchronization unit 502 activates the lens aligned with the viewer's left eye (e.g., lens 512) and deactivates the lens aligned with the viewer's right eye (e.g., lens 510) by signaling the first non-visible light source 504 to emit electromagnetic radiation 514 and signaling second non-visible light source 506 to cease emitting electromagnetic radiation 516, causing the viewer's right lens 510 to become substantially opaque and the viewer's left lens 512 to become substantially transparent as shown in FIG. 5. In this manner, the activation system 500 alternately activates and/or deactivates the pair of lenses 508 in sync with the displayed content to provide three-dimensional imagery to the viewer stereoscopically.

Depending on the embodiment, the opacity of the first lens 510 may increase either in response to the electromagnetic radiation 514 over the first portion of the electromagnetic spectrum or in response to the absence of electromagnetic radiation 516 over the second portion of the electromagnetic spectrum. Similarly, the transparency of first lens 510 may increase either in response to the electromagnetic radiation 516 over the second portion of the electromagnetic spectrum or in response to the absence of electromagnetic radiation 514 over the second portion of the electromagnetic spectrum. In a similar manner, the opacity of the second lens 512 may increase either in response to the electromagnetic radiation 516 over the second portion of the electromagnetic spectrum or in response to the absence of electromagnetic radiation 514 over the first portion of the electromagnetic spectrum, and the transparency of the second lens 512 may increase either in response to the electromagnetic radiation 514 over the first portion of the electromagnetic spectrum or in response to the absence of electromagnetic radiation 516 over the second portion of the electromagnetic spectrum.

Figure 7:
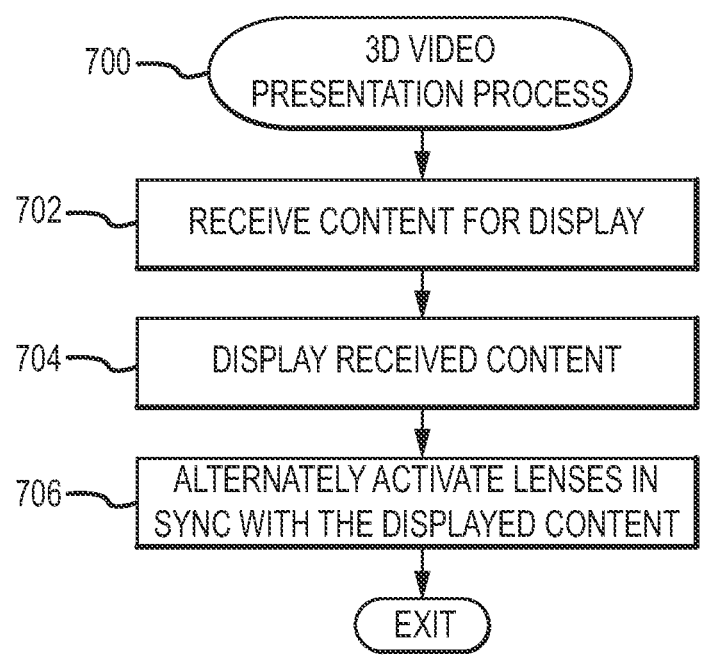
FIG. 7 is a flowchart of an exemplary three-dimensional video presentation process suitable for use with the system of FIG. 1 or FIG. 2.

Referring now to FIG. 7, in an exemplary embodiment, a system 100, 200 may be configured to perform a three-dimensional video presentation process 700 and additional tasks, functions, and operations described below. The various tasks may be performed by software, hardware, firmware, or any combination thereof. For illustrative purposes, the following description may refer to elements mentioned above in connection with FIGS. 1-6. In practice, the tasks, functions, and operations may be performed by different elements of the described system, such as the display system 104, the activation system 108, 208, 300, 500, the processor 112, the display 114, the lenses 118, 306, 508, the synchronization unit 120, 220, 302, 502, and/or the non-visible light source(s) 122, 304, 504, 506. It should be appreciated that any number of additional or alternative tasks may be included, and may be incorporated into a more comprehensive procedure or process having additional functionality not described in detail herein.

Referring again to FIG. 7, and with continued reference to FIGS. 1-6, a three-dimensional video presentation process 700 may be performed to present three-dimensional video to a viewer on a display. In an exemplary embodiment, the three-dimensional video presentation process 700 begins by receiving three-dimensional content for display (task 702). In this regard, the processor 112 and synchronization unit 120, 220 receive video content comprising a plurality of frames from a content source 110 via the receiver system 102. As described above, in an exemplary embodiment, the alternating frames of the received content are encoded or otherwise designated for opposite eyes of a prospective viewer to support the stereoscopic imaging techniques described herein. In an exemplary embodiment, the three-dimensional video presentation process 700 continues by displaying the received content on the display (task 704). In this regard, the processor 112 generates images corresponding to the frames of the received content on the display 114 in a conventional manner, as will be appreciated in the art.

In an exemplary embodiment, the three-dimensional video presentation process 700 continues by alternately activating the lenses of a head-mountable device being worn by a viewer in sync with the displayed content (task 706). As described above, the synchronization unit 120, 220, 302, 502 controls the timing of the electromagnetic radiation emitted by the non-visible light source(s) 122, 304, 504, 506 such that the substantially transparent lens of the pair of lenses 118, 306, 508 corresponds to the designated eye of the viewer for the frame being presented on the display 114. In an exemplary embodiment, the lenses 118, 306, 508 are activated in sync with the displayed content, such that when the display 114 changes from displaying a frame designated for the right eye (or right channel) to displaying a frame designated for the left eye (or left channel), the lens aligned with the viewer's left eye changes from being substantially opaque to being substantially transparent and the lens aligned with the viewer's right eye changes from being substantially transparent to being substantially opaque, and vice versa. In an exemplary embodiment, the synchronization unit 120, 220 receives frames from the receiver system 102 and determines whether the frame being presented on the display 114 corresponds to the right eye (or right channel) or the left eye (or left channel). In accordance with one embodiment, the synchronization unit 120 is coupled to the processor 112 and synchronizes the non-visible light source(s) 120 with the display 114 by accounting for the amount of time required for the processor 112 to process a frame received from the receiver system 102 and present the image corresponding to the received frame on the display 114. In accordance with another embodiment, the synchronization unit 220 is configured to synchronize the non-visible light source(s) 120 by sensing or otherwise detecting whether the frame presented on the display 114 corresponds to the right eye (or right channel) or the left eye (or left channel) to account for the amount of time required for the processor 112 to process a frame received from the receiver system 102 and present the image corresponding to the received frame on the display 114.

As described above, in response to detecting or otherwise determining a frame designated for a viewer's right eye is being presented on the display 114, the synchronization unit 120, 220 activates the lens aligned with the right eye of the viewer by increasing its transparency (or decreasing its opacity) and deactivates the lens aligned with the left eye of the viewer by increasing its opacity (or decreasing its transparency). Conversely, in response to detecting or otherwise determining a frame designated for a viewer's left eye is being presented on the display 114, the synchronization unit 120, 220 activates the lens aligned with the left eye of the viewer by increasing its transparency (or decreasing its opacity) and deactivates the lens aligned with the right eye of the viewer by increasing its opacity (or decreasing its transparency). In this manner, the synchronization unit 120, 220 and/or activation system 108, 208 alternately activates either the lens aligned with the right eye of the viewer or the lens aligned with the left eye throughout operation of the system 100, 200.

For example, in the embodiment of FIGS. 3-4, in response to detecting or otherwise determining a frame designated for a viewer's right eye is being presented on the display 114, the synchronization unit 302 activates the first lens 308 and deactivates the second lens 310 by signaling the non-visible light source 304 to emit electromagnetic radiation 312 in sync with the frame being presented on the display 114. In this manner, the emission of electromagnetic radiation 312 by the non-visible light source 304 is synchronized with the presentation of a right channel frame on the display 114. In response to detecting or otherwise determining a frame designated for a viewer's left eye is being presented on the display 114, the synchronization unit 302 deactivates the first lens 308 and activates the second lens 310 by signaling the non-visible light source 304 to cease emitting electromagnetic radiation 312 in sync with the frame being presented on the display 114. Thus, the emission of electromagnetic radiation 312 starts when a right channel frame is presented on the display 114 and the emission of electromagnetic radiation 312 stops when a left channel frame is presented on the display 114.

Similarly, in the embodiment of FIGS. 5-6, in response to detecting or otherwise determining a frame designated for a viewer's right eye is being presented on the display 114, the synchronization unit 502 activates the first lens 510 and deactivates the second lens 512 by signaling the second non-visible light source 506 to emit electromagnetic radiation 516 and signaling the first non-visible light source 504 to cease emitting electromagnetic radiation 514 in sync with the frame being presented on the display 114. In this manner, the emission of electromagnetic radiation 516 by the non-visible light source 506 is synchronized with the presentation of a right channel frame on the display 114. In response to detecting or otherwise determining a frame designated for a viewer's left eye is being presented on the display 114, the synchronization unit 502 deactivates the first lens 510 and activates the second lens 512 by signaling the first non-visible light source 504 to emit electromagnetic radiation 514 and signaling the second non-visible light source 506 to cease emitting electromagnetic radiation 516 in sync with the frame being presented on the display 114. In this manner, the emission of electromagnetic radiation 514 by the non-visible light source 504 is synchronized with the presentation of a left channel frame on the display 114. Thus, the emission of electromagnetic radiation 516 starts and the emission of electromagnetic radiation 514 stops when a right channel frame is presented on the display 114, and the emission of electromagnetic radiation 516 stops and the emission of electromagnetic radiation 514 starts when a left channel frame is presented on the display 114.

One advantage of the systems and/or methods described herein is that three-dimensional video and/or images may be presented and viewed using a head-mountable device that does not require built-in electronics or require other additional components, such as, polarizers, for operation. Furthermore, the content being displayed may be captured without using filters that may degrade picture quality The general systems, structures and techniques described above may be inter-combined, enhanced, modified and/or otherwise implemented to provide any number of different features. In particular, the term "exemplary" is used herein to represent one example, instance or illustration that may have any number of alternates. Any implementation described herein as "exemplary" should not necessarily be construed as preferred or advantageous over other implementations. Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used in the following description for the purpose of reference only, and thus are not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method of presenting three-dimensional content comprising a plurality of frames, the method comprising:
   displaying the plurality of frames on a display;
   activating a first photosensitive lens configured to be aligned with a first eye when a respective frame of the plurality of frames displayed on the display corresponds to the first eye by emitting electromagnetic radiation, the first photosensitive lens being substantially transparent in response to the electromagnetic radiation; and
   activating a second photosensitive lens configured to be aligned with a second eye when a respective frame of the plurality of frames displayed on the display corresponds to the second eye.

2. The method of claim 1, wherein activating the second photosensitive lens comprises ceasing emitting the electromagnetic radiation, the second photosensitive lens being substantially opaque in response to the electromagnetic radiation and substantially transparent in response to an absence of the electromagnetic radiation.

3. The method of claim 2, wherein the first photosensitive lens is substantially opaque in response to the absence of the electromagnetic radiation.

4. The method of claim 1, wherein the second photosensitive lens is substantially opaque in response to the electromagnetic radiation.

5. The method of claim 1, wherein:
   activating the first photosensitive lens comprises emitting the electromagnetic radiation over a first portion of the electromagnetic spectrum; and
   activating the second photosensitive lens comprises emitting second electromagnetic radiation over a second portion of the electromagnetic spectrum.

6. The method of claim 5, wherein the second photosensitive lens is substantially transparent in response to the second electromagnetic radiation.

7. The method of claim 6, wherein the second photosensitive lens is substantially opaque in response to an absence of the second electromagnetic radiation.

8. The method of claim 6, wherein the first photosensitive lens is substantially opaque in response to the second electromagnetic radiation.

9. The method of claim 8, wherein the second photosensitive lens is substantially opaque in response to an absence of the second electromagnetic radiation.

10. The method of claim 6, wherein the first photosensitive lens is substantially opaque in response to an absence of the electromagnetic radiation over the first portion of the electromagnetic spectrum.

11. The method of claim 6, wherein the second photosensitive lens is substantially opaque in response to an absence of the second electromagnetic radiation.

12. The method of claim 5, wherein the first portion and the second portion are mutually exclusive.

13. The method of claim 5, wherein the second portion comprises a different portion of the electromagnetic spectrum than the first portion.

14. A system comprising:
a processor configured to present a plurality of frames for viewing;
a first source configured to emit first electromagnetic radiation over a first portion of the electromagnetic spectrum;
a second source configured to emit second electromagnetic radiation over a second portion of the electromagnetic spectrum different from the first electromagnetic radiation; and
a synchronization unit coupled to the first source and the second source, wherein the synchronization unit is configured to signal the first source to emit the first electromagnetic radiation such that the first electromagnetic radiation is emitted in sync with a respective frame of the plurality of frames being presented that corresponds to a first eye, and signal the second source to emit the second electromagnetic radiation such that the second electromagnetic radiation is emitted in sync with a respective frame of the plurality of frames being presented that corresponds to a second eye, wherein:
the first electromagnetic radiation is configured to activate a first lens configured to be aligned with the first eye;
the second electromagnetic radiation is configured to activate a second lens configured to be aligned with the second eye; and
the first lens is substantially transparent in response to the first electromagnetic radiation.

15. The system of claim 14, further comprising a display coupled to the processor, wherein the processor is configured to present the plurality of frames on the display.

16. The system of claim 14, wherein the first portion and the second portion are mutually exclusive.

17. The system of claim 14, wherein the second source does not emit the second electromagnetic radiation having a same wavelength or frequency as the first electromagnetic radiation.

18. A set-top box comprising:
a processor configured to present a plurality of frames for viewing;
a first source configured to emit first electromagnetic radiation over a first portion of the electromagnetic spectrum;
a second source configured to emit second electromagnetic radiation over a second portion of the electromagnetic spectrum different from the first electromagnetic radiation; and
a synchronization unit coupled to the first source and the second source, wherein the synchronization unit is configured to signal the first source to emit the first electromagnetic radiation such that the first electromagnetic radiation is emitted in sync with a respective frame of the plurality of frames being presented that corresponds to a first eye, and signal the second source to emit the second electromagnetic radiation such that the second electromagnetic radiation is emitted in sync with a respective frame of the plurality of frames being presented that corresponds to a second eye, wherein:
the first electromagnetic radiation is configured to activate a first lens configured to be aligned with the first eye;
the second electromagnetic radiation is configured to activate a second lens configured to be aligned with the second eye; and
the first lens is substantially transparent in response to the first electromagnetic radiation.

19. The set-top box of claim 18, further comprising a receiver system to receive the frame from a content source, wherein the processor is coupled to the receiver system and configured to present the frame on a display.

* * * * *